United States Patent
Arnold et al.

(10) Patent No.: US 8,495,427 B2
(45) Date of Patent: Jul. 23, 2013

(54) DETECTING DEFECTS IN DEPLOYED SYSTEMS

(75) Inventors: Matthew R. Arnold, Hawthorne, NY (US); Martin Vechev, Hawthorne, NY (US); Eran Yahav, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/578,975

(22) Filed: Oct. 14, 2009

(65) Prior Publication Data

US 2011/0087927 A1    Apr. 14, 2011

(51) Int. Cl.
*G06F 11/00*    (2006.01)

(52) U.S. Cl.
USPC ............ 714/35; 714/47.1; 714/38.1; 717/130

(58) Field of Classification Search
USPC .................................................. 718/104, 105
See application file for complete search history.

(56) References Cited

U.S. PATENT DOCUMENTS

| | | | |
|---|---|---|---|
| 7,805,717 B1 * | 9/2010 | Spertus et al. | 717/158 |
| 2004/0060043 A1 * | 3/2004 | Frysinger et al. | 717/158 |
| 2004/0117771 A1 * | 6/2004 | Venkatapathy | 717/130 |
| 2005/0055694 A1 * | 3/2005 | Lee | 718/100 |
| 2006/0167939 A1 * | 7/2006 | Seidman et al. | 707/104.1 |
| 2009/0328030 A1 * | 12/2009 | Fries | 717/174 |
| 2010/0318994 A1 * | 12/2010 | Holmberg et al. | 718/100 |
| 2011/0066600 A1 * | 3/2011 | Cormode et al. | 707/689 |

OTHER PUBLICATIONS

Arnold et al., QVM: An Efficient Runtime for Detecting Defects in Deployed Systems, OOPSLA'08, Oct. 19-23, 2008, Nashville, Tennessee, USA.

* cited by examiner

*Primary Examiner* — Scott Baderman
*Assistant Examiner* — Jason Bryan
(74) *Attorney, Agent, or Firm* — Scully, Scott, Murphy & Presser, P.C.; Louis J. Percello, Esq.

(57) ABSTRACT

Detecting defects in deployed systems, in one aspect, identify one or more monitoring agents used in a computer program. Total execution metric of the computer program and execution metric associated with the one or more monitoring agents are measured and the measure execution metric is compared with a specified overhead criteria. The execution of the one or more monitoring agents is adjusted based on the comparing step while the computer program is executing to meet the specified overhead criteria.

24 Claims, 3 Drawing Sheets

DETECTING DEFECTS IN DEPLOYED SYSTEMS

FIELD OF THE INVENTION

The present disclosure relates to computer systems and programming, and more particularly to detecting defects in deployed systems.

BACKGROUND

Coping with software defects that occur in the post-deployment stage is a challenging problem: bugs may occur only when the system uses a specific configuration and only under certain usage scenarios. Nevertheless, halting production systems until the bug is tracked and fixed is often not feasible. Thus, developers have to try to reproduce the bug in laboratory conditions. Often the reproduction of the bug consists of the lion share of the debugging effort.

Despite increasing efforts and success in identifying and fixing software defects early in the development life cycle, some defects inevitably make their way into production. The wide variety of deployment configurations and the diversity of usage scenarios is almost a certain guarantee that any large system will exhibit defects after it has been deployed. Detecting and diagnosing defects in a production environment remains a significant challenge. Failures in such environments might occur with low frequency and be virtually impossible to reproduce. For example, a defect might occur due to a specific concurrent interleaving, a specific lengthy user interaction, or a slow resource leak that gradually degrades system performance leading to an eventual crash.

Existing tools for diagnosing defects "in the wild" usually incur a large overhead that may significantly disrupts the operation of the deployed system. On the other hand, reproducing the failure in a test environment (if possible) may require considerable time and effort. One way to detect rarely occurring defects is to continuously monitor a system for violations of specified correctness properties. For example, this can be achieved by using global property monitors and local assertions. However, the typical cost of these techniques prevents programmers from widely using them in production environments.

BRIEF SUMMARY

A method and system for detecting defects in deployed systems are provided. The method, in one aspect, may include identifying one or more monitoring agents used in a computer program, and collecting a total execution metric of the computer program and execution metric associated with the one or more monitoring agents. The method may further include comparing the execution metric with one or more specified overhead criteria, and adjusting execution of the one or more monitoring agents based on the comparing step while the computer program is executing to meet the specified overhead criteria.

A system for detecting defects in deployed systems, in one aspect, may include a virtual machine operable to identify one or more monitoring agents used in a computer program. The virtual machine may be further operable to collect a total execution metric of the computer program and execution metric associated with the one or more monitoring agents. The virtual machine may be also operable to compare the execution metric with one or more specified overhead criteria, and adjust execution of the one or more monitoring agents based on the comparing step while the computer program is executing to meet the one or more specified overhead criteria.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect describes a runtime environment that is able to detect and help diagnose defects in deployed systems. The runtime environment of the present disclosure may be specialized and use the technology and infrastructure available in a virtual machine to improve software quality. In this disclosure, this specialized runtime environment is referred to as the Quality Virtual Machine (QVM). QVM in one embodiment detects defects by continuously monitoring the execution of the application in a production setting. QVM enables checking of violations of user-specified correctness properties, e.g., typestate safety properties, Java™ assertions, and heap properties, for instance, pertaining to ownership. QVM may provide a novel overhead manager or the like component for enforcing a user-specified overhead budget (or criterion) for quality checks, for example, thereby enabling provision of a balanced trade off between the cost of the monitoring process and the maintenance of sufficient accuracy for detecting defects. QVM allows the user to specify an overhead, for instance, that may be considered acceptable for the current monitoring environment. QVM in another aspect may collect useful information from the executing program while also staying within the specified budget or criterion or criteria.

In one embodiment, QVM provides an interface that allows software monitoring clients to be executed with a controlled overhead. Based on this interface, software monitoring clients may continuously monitor application correctness. Software monitoring clients may use a combination of simple global property monitors (typestate properties) and assertions. In addition, QVM may automatically collect debug information which enables effective defect diagnosis. QVM may be implemented on top of a Java™ Virtual Machine.

Figure 1:
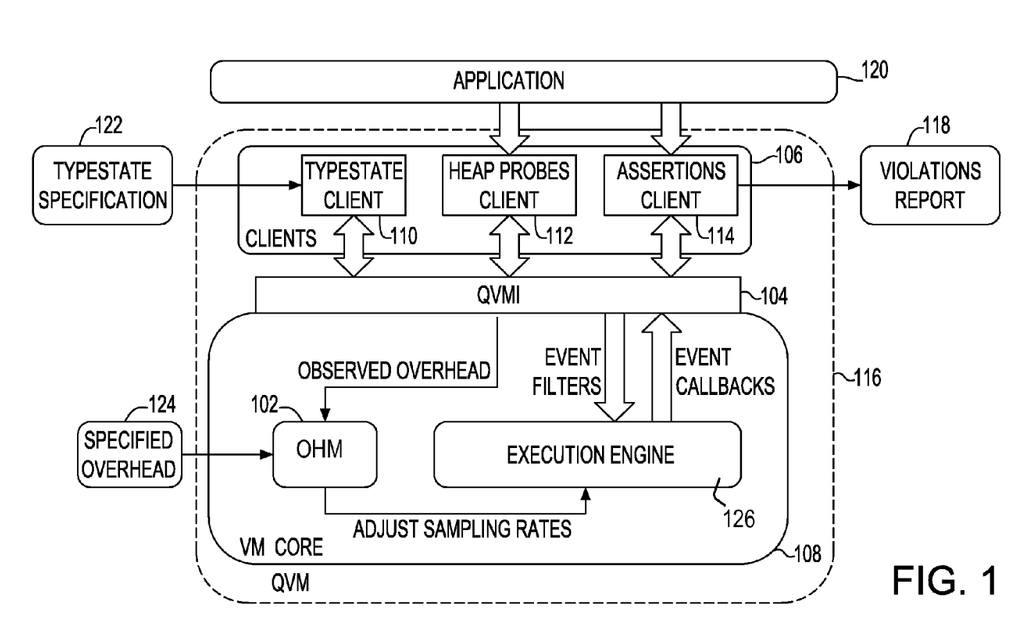
FIG. 1 shows the overall architecture of QVM in one embodiment of the present disclosure.

FIG. 1 shows an overall architecture of QVM in one embodiment of the present disclosure. In this architecture, the overhead manager (OHM) 102 and the QVM Interface (QVMI) 104 work together to provide clients 106 with a transparent adaptive overhead management. In one embodiment, OHM 102 implements a control system enabling users to bound the overhead incurred by QVM clients. The OHM 102 performs fine-grained monitoring of the time spent in the clients and adapts the sampling to stay near or below overhead bounds. QVMI 104 is a performance-aware profiling/monitoring interface that allows client analyses to remain decoupled from the virtual machine (VM) 108, while maintaining efficiency. QVMI 104 may allow for quick and easy development of powerful, yet efficient dynamic analyses. QVM clients 106 are a flexible set of clients that leverage QVMI. QVM clients 106 enable checking of a variety of correctness properties with controlled overhead. The clients 106 may use QVMI 104 without the need to be aware of overhead management mechanisms, but with the ability to at least partially control it when desired. For example, the clients 106 may be able to specify using QVMI 104 which objects, methods, and others to track for their monitoring function. The QVMI 104 may invoke events to track the specified objects, methods, and others. The OHM 102 may use the information collected by QVMI 104 to adjust the sample rate for tracking such that the overhead matches the desired overhead specified, for instance, by the user.

For instance, an application or the liked code 120 may include statements or the like that make calls to monitoring agents or QVM clients 110, 112, 114 and others. The monitoring agents 110, 112, 114 utilize QVMI to interact with the QVM for checking of violations in the application 120. For instance, typestate client or monitoring agent 110 checks whether an object behaves as it is supposed to behave according to the typestate specification 122. Heap probes client or monitoring agent 112 checks, for example, for correct properties of allocated objects in the heap. Assertions client or monitoring agent 114 checks if the specified assertions are true. Other clients or monitoring agents may be also implemented. Violations found may be reported 118, for instance, in a form of a text document, printout, electronic document, alerts, and others.

OHM 102 receives specified overhead budget or criterion 124, for instance, as an input from the user. Overhead budget or criterion also may be predetermined and stored, and be accessible to the OHM 102. OHM 102 measures the time QVMI 104 spends in executing the monitoring agents or client 106 and tracking one or more objects, methods and others that are to be monitored by the monitoring agents or clients 106 for checking for violations and properties associated with the application 120. OHM 102 also may measure the total execution time of the application 120. OHM 102 determines the overhead incurred by the QVMI 104 and compares the overhead with the specified overhead 124. Based on the comparison, OHM 102 may increase or decrease the sampling rate, e.g., frequency of tracking the objects and/or methods associated with monitoring performed by the monitoring agents or clients 106. The execution engine 126 executes the tracking according to the frequency specified in the sampling rate. The execution engine 126 provides callbacks (i.e., result of execution of tracking operations) to the monitoring agents 106 via the QVMI 104. The adjustment of the sampling rate may occur in a feedback manner, for example, as the OHM 102 measures the time periodically or continuously. The details of the QVM implementation are provided below as an example. Other implementations are possible.

QVMI: The QVM Interface 104

QVM 116 provides QVMI 104 that allows software monitoring clients to be executed with a controlled overhead. In one aspect, QVMI 104 allows the client to specify the events of interest, and these events may be provided by the interface 104. Clients are kept separate from the internal VM implementation that collects the events. Similarly, although the profiling clients 106 may be packaged as part of the VM 108, keeping a clear abstraction interface between the core VM details and the profiling clients allow for both maintenance and ease of adding additional clients.

Filtering on the VM Side

The QVM interface 104 of the present disclosure in one embodiment is structured for allowing as much filtering as possible to occur on the VM side of the interface. For example, if an analysis client needs method callbacks, it specifies what methods callbacks are necessary.

This allows the remainder of the program to run at full speed. Similarly, the client may request method callbacks only for a subset of the objects in the program. The VM 108 can use its suite of dynamic optimization techniques to achieve an efficient implementation of the sampled profile.

Table 1 shows a partial list of the operations supported by QVMI. Clients that register with QVMI have to support a similar set of operations (as described below). In addition to the operations listed in Table 1, QVMI includes similar callbacks for field read and writes, exceptions being thrown, and other events supported by standard interfaces such as JVMTI. In the table, operations of different stages of the execution are separated by double horizontal lines. The manner in which these operations are used is illustrated below.

TABLE 1

A partial list of the operations that may be supported by QVMI

| Method | Description |
|---|---|
| void registerClient(Client c) | Registers a client to receive callbacks |
| TrackLevel is TrackedAlloc(AllocSite as) | should the specified allocation site be tracked |
| CallTrackLevel is TrackedCallSite(CallSite cs) | should the specified call site be tracked |
| boolean shouldExecute(Site s) | should this site fire an event (based on sampling info) |
| void allocEvent(AllocSite as) | tracked allocation event |
| void invocationEvent(CallSite as) | tracked invocation event |
| void objectDeath(Object o) | object death event |

On VM initialization, for example, upon startup of the virtual machine 108, the clients 106 register themselves with QVMI 104 to receive callbacks by calling registerClient. On method compilation, for instance, during the compilation of a method, the VM 108 may query the QVM agents 106 to determine whether the code 120 being compiled needs any form of instrumentation.

This insures that maximal filtering occurs; instrumentation is not inserted on any program statements if it is not required by at least one client. This querying may be done by invoking QVMI operations such as is TrackedAlloc and is TrackedCallSite, which query all of the registered QVM clients 116 to obtain a TrackLevel, which determines what level of instrumentation is needed. For example, for typestate client 110, the compiler may prompt QVMI 104 to check whether object allocation or method call sites in the code should be tracked.

During execution, for example, depending on the tracking-level, the VM 108 fires events for tracked sites by invoking operations such as allocEvent and invocationEvent. When an object is collected by the garbage collector, QVMI 104 is notified, for example, by calling objectDeath.

Property-Guided Sampling

In one aspect, QVMI 104 provides the ability to perform property-guided sampling. Sampling is a mechanism QVM 116 uses to reduce analysis overhead. QVM 116 performs property-guided sampling, ensuring that the sampled profile maintains sufficient properties to make the dynamic analysis meaningful.

For example, QVM 116 supports a novel feature referred to herein as object-centric sampling. This technique allows an analysis to sample at the object instance level; an object can be marked as tracked and the analysis can receive all profile events for this object, while receiving no events for untracked objects. This allows overhead reduction via sampling, without destroying the profile properties needed for the dynamic analysis to produce meaningful results.

The points in the execution at which sampling decisions are made (i.e., whether an object is tracked, whether an assertion is executed) in this disclosure are referred to as origins. Allocation sites are origins in our implementation of object-centric sampling in one embodiment. The decision of whether an object is tracked may be made at allocation time; if sampled, a bit is set in the object header to mark the object as tracked. A short inlined code sequence checks this tracked bit on calls to QVM methods to determine whether a callback is needed. In addition to allowing the clients 106 use the QVMI 104, the QVMI 104 may be exposed to enable external clients (not shown).

Overhead Manager 102

The QVM Overhead Manager, or OHM 102 allows the user to specify an overhead that is considered acceptable for the current monitoring environment. Thus, the acceptable overhead may be one of the inputs to QVM 116. Given an overhead budget, the QVM 116 in one embodiment strives to collect as much useful information as possible from the executing program while staying within the specified budget. There may be instances where if the maximum overhead specified is too low, QVM may not report any information. This way, control of the overhead is maintained and performance crisis that may result from the overhead is avoided, even if no information is received. In one embodiment, OHM 102 may include three components: monitoring component that measures the overhead imposed by the QVM clients 106, sampling strategy for sampling each origin (e.g., allocation site or an assertion site) to ensure the system stays within the overhead budget, and controller component that adjusts the sampling strategies for each origin based on the measured overhead.

Monitoring

The overhead monitor 102 uses fine granularity timers on entry and exit to all QVMI calls to record the time spent in QVM clients 106 and in the QVMI 104 itself. The time is maintained separately for each origin so that the sample rate of each origin can be adjusted independently.

Timer Accuracy

The OHM 102 implementation may use inline assembly to read the cycle counter using the Intel™'s RDTSC (Read Time Stamp Counter) instruction. This mechanism results in very fast and accurate time stamping on entry and exit of the QVMI 104. Other implementations are possible.

Measuring Total Application Time

The timers measure time spent performing QVM tasks. To compute overhead relative to the non-QVM application, the OHM 102 also measures the total execution time. QVM time is measured and accumulated from all running threads, thus the total time may be the sum of the time spent executing on all processors. As an example, total time may be computed by using a system call to obtain the total time used by the Java™ VM process. In another embodiment, QVM 102 performs overhead tracking at the thread-level. If overhead budgets are tracked and enforced per-thread, total overhead as perceived by the user will always be within budget as well.

Sampling Strategy

The QVMI 104 maintains separate overhead statistics for each origin (e.g., an execution point or an object allocation point), allowing the OHM 102 to increase or decrease the sample rate independently for each origin. Having origin-specific sample rates enables advantages for the client analysis. Maintaining a single sample rate would be sufficient for managing total overhead, but would be likely to miss origins in infrequently executed code. With origin-specific sampling, the controller can reduce overhead by scaling back hot origin sites, but continues to exhaustively track objects from cold sites, thus allowing the client analysis to see a broader view of the program execution.

In one embodiment, sampling may be implemented by maintaining a sampleCounter and a sampleCounterReset for each origin. At runtime, the checking code at each origin site decrements and checks sampleCounter; if it is less than zero, the origin is selected to be tracked and the counter is reinitialized by the value in sampleCounterReset. The sampleCounterReset for each origin is adjusted by the Overhead Controller to change the sample frequency for that origin, thus reducing or increasing its overhead.

To avoid severe performance degradation when a hot, long lived object is tracked, the QVM 116 in one embodiment may support the notion of an emergency shutdown. On each QVMI callback for allocations and invocations, the system checks a flag to determine whether an emergency shutdown is needed. If so, it disables the monitoring bit in the object header such that the object will no longer be sampled. The client analysis may now need to discard this object, as the method callbacks are not complete. However, this mechanism allows the system to ensure that overhead can be controlled.

Overhead Controller

The job of the Overhead Controller in one embodiment is to periodically check the QVM overhead, and adjust the sampling frequencies accordingly. If the overhead is above the budget, sample frequencies are reduced; if the overhead is below budget, the frequencies are increased. To avoid oscillation and large spikes in overhead, the controller monitors not only total overhead, but recent overhead. Recent overhead is computed via exponential decay; a second copy of application time and QVM time are maintained, and multiplied by a decay factor each time the controller wakes up. This gives more weight to recent timings, effectively measuring the overhead over a previous window of execution.

The controller functions to keep the overhead below the overhead budget. The controller may also function to maximize the client executing time within that budget. Thus the controller reduces sample frequencies if either the total overhead or recent overhead exceed their budgets.

If the overhead deviates too high above the budget, the controller may enact the emergency shutdown to stop profiling in the current set of objects, and start tracking new objects once the overhead is within budget.

Origin-Specific Adjustment

The QVMI 104 may maintain separate overhead statistics for each origin, allowing the OHM 102 to increase or decrease the sample rate independently for each origin. These origin-specific adjustments are made as follows. The controller decides on sample rates for each origin by maintaining a second overhead threshold, called originOverheadBudget. The sample rate of each origin is adapted to stay below this overhead budget. If the overhead for an origin is below originOverheadBudget, the sample rate is increased (or left alone, for example, if the origin is already exhaustively tracked). When the controller sees that total overhead is too high, it reduces the originOverheadBudget, thus effectively reducing the sample frequency only for origins that exceed this overhead threshold. The originOverheadBudget is always less than or equal to the total overhead budget, but may be significantly lower if there are a large number of origins.

QVM Clients 106

Clients 116 may be built on top of the QVM platform 116. In addition, QVMI may be exposed to external clients for those clients to be able to utilize the runtime defect detection of the present disclosure. As examples, this disclosure describes three clients 110, 112, 114 built on top of the QVM platform 106. The three clients 110, 112, 114 cover a range of user properties: ranging from local assertions to continuous monitoring using temporal safety properties.

Typestate

It is now shown how QVM 116 may be used to dynamically check typestate properties. Typestate is a framework for specifying a class of temporal safety properties. Typestates can encode correct usage rules for many common libraries and application programming interfaces (APIs). For example, typestate can express the property that a Java™ program should dispose a native resource before its Java™ object becomes unreachable and is collected by the garbage collector.

This disclosure uses the typestate client to demonstrate three contributions of QVM platform: (i) adaptive overhead management; (ii) timed typestate transitions; (iii) collection of additional detailed debug information with low overhead.

Using the QVM platform 116 to implement dynamic typestate checking also provides us with an advantage in getting object-death callbacks directly from the garbage collector and not relying on a finalizer method to be called. This guarantees that object-death events are fired in a timely manner (which is not guaranteed to happen when using finalizers) and allows us to measure resource-drag more precisely.

In one embodiment, QVM 116 uses a simple input language to let the user specify a finite-state automaton that represents the typestate property, and the types to which it applies. In this disclosure, a type that appears in at least one typestate property is referred to as a tracked type. Once the tracked type is specified, every object of this tracked type may be instrumented with additional information that maps the object to its typestate. During execution, QVM 116 updates the typestate of each tracked object, and when an object reaches its error state, QVM 116 records an error report 118 in a designated log file.

Figure 2:
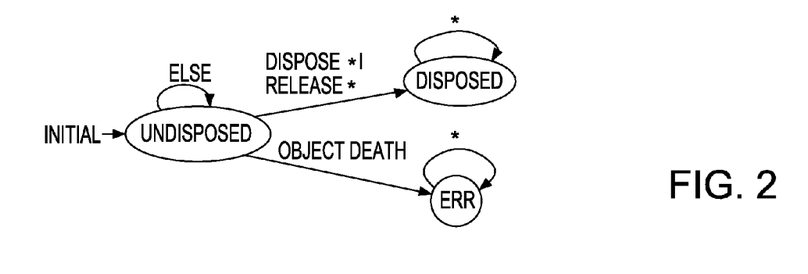
FIG. 2 shows an example typestate property (represented as a finite state automaton) that identifies when a Standard Widget toolkit (SWT) resource has not been disposed prior to its garbage collection.

FIG. 2 shows a typestate property (represented as a finite state automaton) that identifies when an Standard Widget toolkit (SWT) resource has not been disposed prior to its garbage collection. The tracked types are not shown in the figure, as this property applies to a large number of types (e.g., org/eclipse/swt/widgets/Widget). Since all states other than the designated error state are accepting, notation may be simplified by not using a special notation for accepting states. Edges of the finite-state automaton may be labeled with regular expressions that define when the transition is taken. For example, the transition from undisposed to disposed occurs when invoking a method whose name begins with dispose or release. Else may be used to denote a transition that is fired when no other transition from the state can be matched. Note that the automaton is deterministic in this example.

For every typestate property, QVM 116 tracks the number of times it has been violated. When the number of violations passes a specified threshold, QVM 116 starts recording additional debugging information in the form of a typestate history. A typestate history of an object o is an abstraction of the sequence of method invocations performed during execution with o as a receiver. The name typestate history is used because the sequence of method invocations may be summarized as an annotated DFA, similar to a typestate property.

A state in the typestate history represents the state of the object after a specific method has been invoked on it. A state in the history is labeled with a set of (bounded) contexts—representing the contexts in which the method has been invoked. A transition between states m1 and m2 in the history represents the fact that the method corresponding to m2 has been invoked immediately after the method corresponding to m1 has been invoked.

A typestate history therefore provides information about the way a single object that violates the property was used in the program. This may help the programmer to diagnose the cause of the reported violation.

Figure 3:
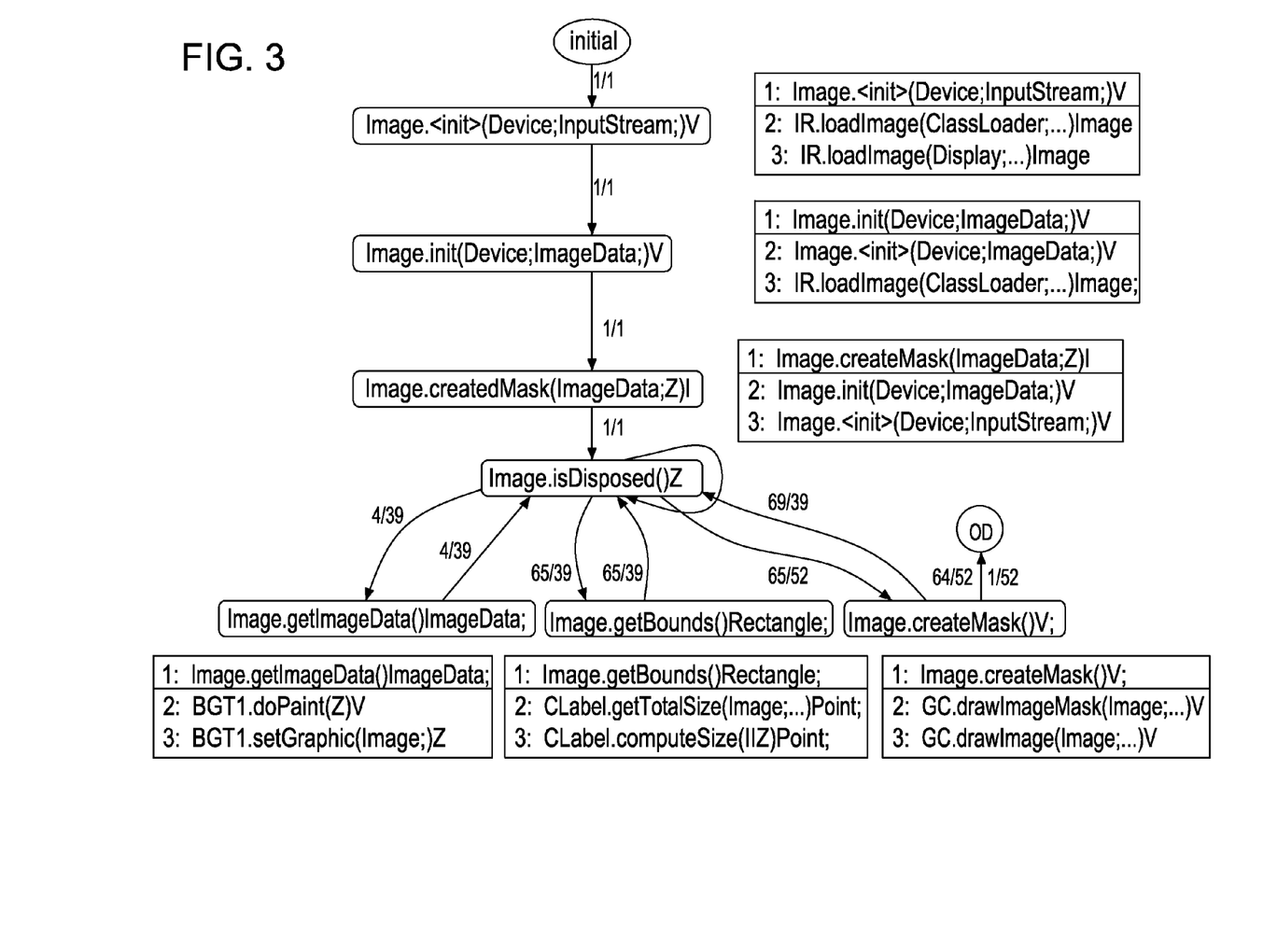
FIG. 3 shows an example typestate history.

FIG. 3 shows an example typestate history produced by QVM. This provides an account of the behavior of a single object that violates the property. In the figure, the type name BufferedGraphicTableItem1 is abbreviated to BGT1, and the type name ImageRepository to IR. In figures of typestate histories method signatures are not shown on the edges because the label of an edge is always identical to the label of its target state.

The typestate history of FIG. 3 contains cycles and multiple invocations of methods. The label on a transition edge represents the number of times this transition occurred in the execution and the last time when it occurred. For example, the transition from the state in which createMask is the last method invoked on the object to the state in which is Disposed is the last method invoked on the object occurs 64 times in the execution summarized by the history of FIG. 3. The last time in which the transition occurred is 52, where time is measured as the number of allocations performed by the program. In the figure, the time counter divided by 1024 is shown.

Resource Drag and Lag

Since QVM tracks the last time each transition took place, it can be used to identify when a resource is not released in a timely manner (known as resource drag). In such cases it is sometimes possible to improve performance by releasing the resource earlier. Similarly, since QVM also tracks calls to constructors and objectdeath events, it can be used to identify when an object is allocated too early (memory lag) or kept reachable for a longer time than necessary (memory drag).

In some cases, static analysis can be used to verify that a typestate property is never violated, or that some transitions of a typestate property never occur in a program. These static approaches can be used to reduce the runtime overhead by eliminating some of the dynamic checks.

Local Assertions

To allow adjustment of overhead, Java™ assertions may be allowed to be sampled. This means that during execution, QVM may sometime choose not to evaluate an assertion.

Heap Probes

QVM enables the dynamic checking of various global heap properties such as object-sharing, heap-ownership, thread-ownership and reachability. These properties are useful for both debugging and program understanding purposes.

QVM provides a library that exports a set of methods, for example, one for each heap property. These library methods are referred to as heap probes. The programmer can invoke heap probes from a program in order to inspect the shape of the heap at a program point. The library uses various components of the underlying runtime in order to obtain an answer. Table 2 list examples of probes. In the table, TC(o) is used to denote the set of all objects that are transitively reachable from o. Technically, o can refer to either an object or a thread. Similarly to non-heap probes, our heap-probes can be sampled by the overhead manager to allow adjustment of overhead, and can therefore evaluate to one of three possible values: true, false, and unknown. The return value of a heap probe can be used in a standard Java assertion. When a heap probe is used inside an assertion it may be referred as a heap assertion.

TABLE 2

QVM heap probes

| Probe Name | Description |
| --- | --- |
| isHeap(Object o) | Returns true if object o is pointed to by a heap object, false otherwise |
| isShared(Object o) | Returns true if object o is pointed to by two or more heap objects, false otherwise |
| isObjectOwned(Object $o_1$, Object $o_2$) | Returns true if o1 dominates o2, false otherwise |
| isObjectOwned(Object o) | Returns true if the object pointed to by this dominates o, false otherwise |
| isThreadOwned(Thread $t_a$, Object o) | Returns true if ta dominates o, false otherwise |
| isThreadOwned(Object o) | Returns true if the current thread dominates o, false otherwise |
| isUniqueOwner(Object root) | Returns true if root dominates all objects in TC(root) |
| isReachable(Object src, Object dst) | Returns true if object dst is reachable from object src |

Disposal of SWT resources is based on two principles: (i) the object which allocated the resource is responsible for its disposal; (ii) disposing a parent object disposes its children. These principles work well for many cases as a large number of the allocated resources are set to form immutable containment tree that guarantees proper (albeit not timely) disposal. However, the treatment of shared resources such as Color, Fonts, and Images, is more complicated and error prone.

For shared resources, finding the proper disposal point in the program may be rather challenging. In particular, the disposal may be based on programmer knowledge of the last use of the shared resource in the application. The QVM of the present disclosure, in one aspect, allows this check to be performed. The following is an example code that shows how a QVM assertion can be used to check that a resource is not shared by others, before it is being disposed. The code fragment shown here corresponds to a common idiom for disposing a resource by a dispose listener.

```
canvas.addDisposeListener (new DisposeLinstener( ) {
    @Override
    public void widgetDisposed (DisposeEvent arg0) {
        if (img != null && !img.isDispose( )) {
            assert (QVM.isObjectOwned (img));
            img.dispose ( );
        }
    }
}
```

When assertions are not sampled, our approach is also applicable for reducing verification efforts by adding runtime checks of heap properties. For example, establishing that parts of the heap are disjoint may allow us to employ more efficient verification techniques that abstract each part separately. The heap operations supported by QVM could be extended to provide a comprehensive runtime support for ownership.

Implementation

Examples of implementation details of object-centric sampling, as well as QVM clients are now described.

Object-Centric Sampling

There may be two components to the efficient implementation of object-centric sampling, although not limited to only two. First is the ability to obtain a single free bit in the object header, to enable efficient checking of whether an object is tracked.

Once identified as a tracked object, QVM clients need the ability to associate analysis data with an object. As an example, this may be implemented in QVM by creating an OBJECTINFO for every tracked object. This ObjectInfo is then passed to the client on all object-related callbacks so the client can lookup or store data associated with the object (such as DFA state, etc).

The mapping from object to ObjectInfo may be performed via a hashtable lookup. On allocation of an object, the corresponding ObjectInfo is created and inserted into the hashtable; on object death, they are removed. QVMI callbacks that require access to the ObjectInfo obtain it by doing a hash lookup. The hashtable lookup may be performed only for sampled objects; the inlined fast path only checks the tracked bit in the object header.

Another embodiment of the implementation may be to reserve a word in the object header to point to the object's ObjectInfo.

Typestate Client

Upon VM startup, the typestate module loads all of the user supplied properties, parses and stores that information in its own internal data structures. The typestate module then registers itself with the runtime via the QVMI.registerClient call.

On method compilation, the QVMI interface is called by the just in time compiler (JIT) via the is TrackedAlloc and is TrackedCallSite functions to determine whether instrumentation is needed for allocations and calls. These functions return a value of type TrackLevel. This type can take on one of three totally ordered values: NEVER (the minimal value), SOMETIMES and ALWAYS (the maximal value). All of the registered QVM clients are queried and the return result is computed by taking the maximal value from all of the client responses to ensure that sufficient instrumentation is inserted.

QVM then adjusts the instrumentation based on the tracking level. If the tracking-level is ALWAYS or SOMETIMES, QVM instruments the code with a callback to report the event that occurred. In the case of SOMETIMES, QVM inserts inlined logic to decide (during execution) whether the callback gets invoked. If the tracking-level is NEVER, no code instrumentation is performed by QVM for the site.

For allocations sites marked with track level SOMETIMES, the inlined sampling logic consults the sampling strategy for that origin. If selected for sampling, the typestate allocation handler is called via the QVMI allocEvent call. The handler creates its internal QVM tracking structure for the allocated object, and marks the object as tracked by setting a bit in the object header. There could be multiple tracking structures per-object (e.g., the object is part of multiple typestate properties).

For method invocations tagged with SOMETIMES, the inlined code sequence checks whether the receiver is a tracked object by checking the tracked bit in the header. This check is executed even for inlined methods to ensure that callbacks are not optimized away by the JIT. If the object's tracked bit is set, QVMI's invocationEvent is invoked which then calls the typestate invocation handler. The handler is passed the receiver object, that object's OBJECTINFO, and the method that was invoked. This handler updates the tracking structure for each DFA the object participates in.

In one embodiment of an implementation for typestate, the object-centric tracking and sampling capabilities provided by QVMI may be used, and a check of whether the object is tracked may be inlined. This keeps overhead low by ensuring that QVMI is invoked only for tracked (sampled) objects.

There are many other such property specific optimizations that can be made. For example, if it is known that the tracked object is in an error state that will not be exited, QVM does not need to invoke any other callbacks on this object.

On Object Death

The garbage collector may be instrumented to provide precise death events. Whenever an object is detected to be unreachable during the sweep phase of the collector, the collector calls the QVMI's objectDeath function. That function leads to calling the typestate module's handler for death events, where all object tracking information is freed (if the object is tracked), ensuring no memory leakage. If the object is found to be in a nonaccepting state, an error is reported.

Collecting Typestate Histories

In typestate histories, a notion of "time" may be used to record when events occurred. The time may be measured as the number of allocations performed by the program. To provide a scalable and efficient implementation of global clock, each thread maintains a local allocation counter, and these are aggregated to a single global (approximate) time every 10 millisec. The precision of the aggregate global clock can be adjusted by the user by changing the frequency of aggregation operations (at the cost of a performance hit when using higher frequency).

Although the typestate module is written as part of the VM, it is completely isolated from the VM via the QVMI interface; this interface can be used to easily write clients to check properties other than typestate. By having access to an unused bit in the object header bits, QVM is able to efficiently perform object-centric sampling without needing to store additional words in the object. Moreover, the ability to precisely intercept object death events frees us from having to rely on technique such as finalizers and weak references.

Figure 4:
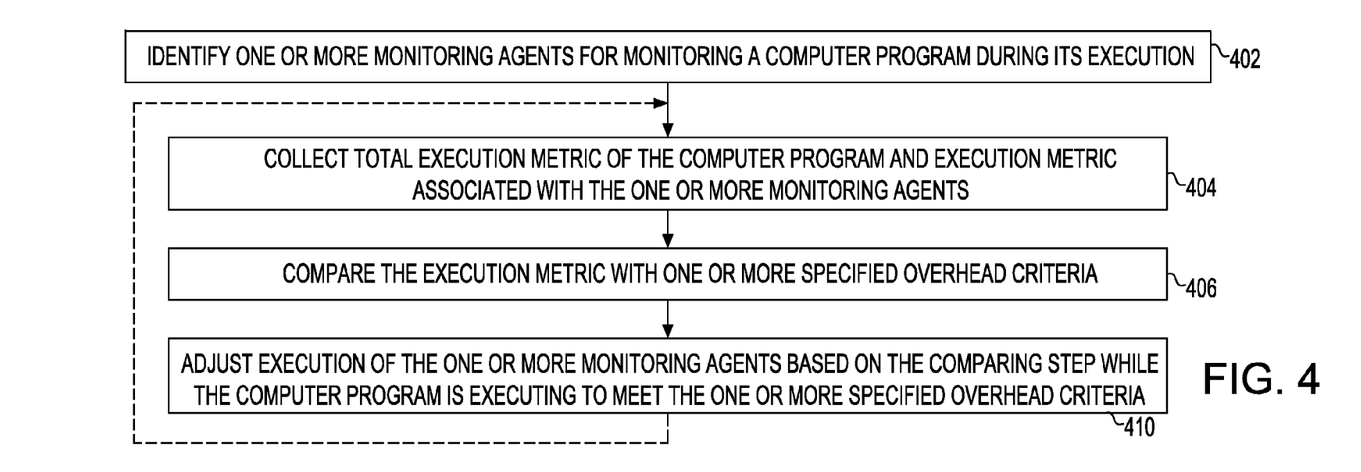
FIG. 4 is a flow diagram illustrating a method of detecting defects in deployed systems in one embodiment.

FIG. 4 is a flow diagram illustrating a method for detecting defects in a deployed system in one embodiment of the present disclosure. At 402, one or more monitoring agents are identified for monitoring the program during its execution. Monitoring agents may include clients discussed above such as typestate client, heap probes client, assertions client and others. For example, the QVMI may identify the monitoring agents as those that registered. QVMI may query those agents for determining whether the code (or computer program) that calls those agents needs instrumenting, for instance, to be able to track one or more objects and methods in the code specified by the agents.

At 404, execution metric of the code and the execution metric associated with executing the one or more agents are measured and collected. For example, the OHM may measure the time QVMI spends in executing the monitoring agent related operations. This measured metric may be compared with the total execution time of the code, for instance, to determine the percentage of time the runtime execution of the code is spent performing detecting defects (e.g., via the monitoring agents).

At 406, the execution metric is compared with one or more specified overhead criteria. The one or more criteria, for example, may be received from the user as an input. At 408, the OHM adjusts execution of the one or more monitoring agents to meet the one or more specified overhead criteria. For instance, if the execution metric of the one or more monitoring agents indicate that more time is being spent as allowed by the specified overhead criteria, the OHM may decrease the frequency of sampling associated with the one or more monitoring agents. Conversely, if the execution metric of the one or more monitoring agents indicate that less time is being spent than allowed by the specified overhead criteria, the sampling frequency may increase.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
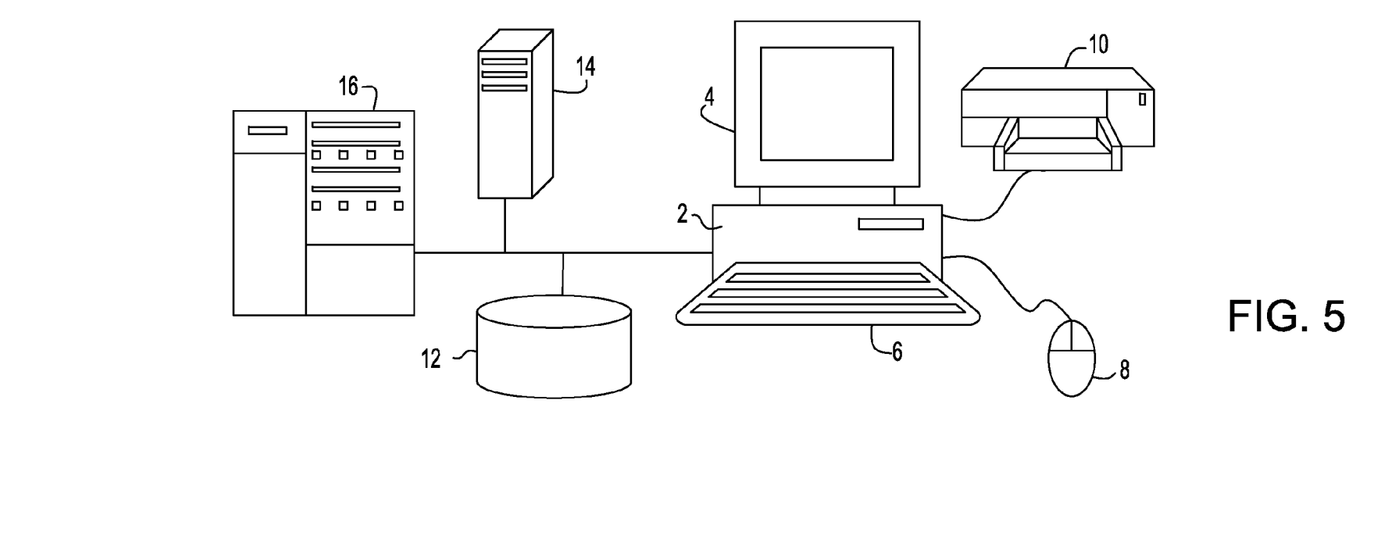
FIG. 5 illustrates an example of a computer system, in which the systems and methodologies of the present disclosure may be carried out or executed.

Referring now to FIG. 5, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of detecting defects in deployed systems, comprising:
    identifying one or more monitoring agents used in a computer program;
    providing an interface comprising a plurality of operations for executing said one or more monitoring agents;
    collecting a total execution metric of the computer program and execution metric of said interface in executing the one or more monitoring agents;
    determining relative overhead incurred by said interface in executing the one or more monitoring agents based on said total execution metric of the computer program and the execution metric of said interface;
    comparing, using a processor, the determined relative overhead with one or more specified overhead criteria; and
    adjusting execution of the one or more monitoring agents based on the comparing step while the computer program is executing to meet the one or more specified overhead criteria,
    wherein said relative overhead is maintained separately for an origin for adjusting to be performed independently of other origins,
    wherein said identifying comprises at least identifying said one or more monitoring agents that have registered with a virtual machine via one or more of the operations of the interface during the startup of the virtual machine, and wherein during compilation of the computer program, the virtual machine queries said registered one or more monitoring agents via one or more of the operations of the interface to determine whether the computer program being compiled needs a form of instrumentation.

2. The method of claim 1, wherein the identifying one or more monitoring agents further includes the virtual machine querying the one or more monitoring agents to determine whether to instrument the computer program for tracking, the virtual machine filtering tracking of one or more events during execution of the computer program based on the determination.

3. The method of claim 2, wherein the collecting of execution metric associated with the one or more monitoring agents includes collecting execution metric for each of the one or more events being tracked.

4. The method of claim 2, wherein the one or more events include one or more actions associated with one or more methods, one or more actions associated with one or more objects, or combinations thereof.

5. The method of claim 1, wherein the one or more monitoring agents include an assertion client, a typestate client, a heap probe client, or combinations thereof.

6. The method of claim 1, further including:
    disabling execution of the one or more monitoring agents in response to determining performance degradation of the computer program to a predetermined level.

7. The method of claim 1, further including:
    recording information associated with execution of the one or more monitoring agents.

8. The method of claim 1, wherein the adjusting includes:
    increasing or decreasing frequency of callbacks to the one or more monitoring agents.

9. The method of claim 1, wherein specified overhead criteria is user specified.

10. The method of claim 1, wherein the relative overhead is computed by giving more weight to overhead detected during more recent time window of execution of the computer program.

11. A system for detecting defects in deployed systems, comprising:
    a processor; and
    a virtual machine operable to identify one or more monitoring agents used in a computer program; and
    a virtual machine interface comprising a plurality of operations operable to interact with the one or more monitoring agents, the virtual machine further operable to collect a total execution metric of the computer program and execution metric of the virtual machine interface in executing the one or more monitoring agents, the virtual machine further operable to determine relative overhead incurred by the virtual machine interface in executing the one or more monitoring agents based on the total execution metric of the computer program and the execution metric of the virtual machine interface, the virtual machine further operable to compare the determined relative overhead with one or more specified overhead criteria, and adjust execution of the one or more monitoring agents based on the comparing step while the computer program is executing to meet the one or more specified overhead criteria, wherein said relative overhead is maintained separately for an origin for adjusting to be performed independently of other origins,
    wherein the virtual machine identifies said one or more monitoring agents that have registered with the virtual machine via one or more of the operations of the virtual machine interface during the startup of the virtual machine, and wherein during compilation of the computer program, the virtual machine queries said registered one or more monitoring agents via one or more of the operations of the virtual machine interface to determine whether the computer program being compiled needs a form of instrumentation.

12. The system of claim 11, wherein the virtual machine further includes:
    an overhead manager operable to measure the total execution metric of the computer program and execution metric associated with the one or more monitoring agents.

13. The system of claim 12, wherein the overhead manager is further operable to adjust the execution of the one or more monitoring agents based on sampling strategy, the measured metrics and the specified overhead criteria.

14. The system of claim 11, wherein the virtual machine interface includes at least an interface to register a client to receive callbacks, an interface for specifying an allocation site to be tracked, an interface for specifying a call site to be tracked, an interface specifying whether an event should be executed, an interface for tracking an allocation event, an interface for tracking an invocation event, an interface for notifying end of an object, or combinations thereof.

15. The system of claim 11, wherein the specified overhead criteria is user specified.

16. A non-transitory computer readable storage medium storing a program of instructions executable by a machine to perform a method of detecting defects in deployed systems, comprising:
   identifying one or more monitoring agents used in a computer program;
   providing an interface comprising a plurality of operations for executing said one or more monitoring agents;
   collecting a total execution metric of the computer program and execution metric of said interface in executing the one or more monitoring agents;
   determining relative overhead incurred by said interface in executing the one or more monitoring agents based on said total execution metric of the computer program and the execution metric of said interface;
   comparing, using a processor, the determined relative overhead with one or more specified overhead criteria; and
   adjusting execution of the one or more monitoring agents based on the comparing step while the computer program is executing to meet the one or more specified overhead criteria,
   wherein said relative overhead is maintained separately for an origin for adjusting to be performed independently of other origins,
   wherein said identifying comprises at least identifying said one or more monitoring agents that have registered with a virtual machine via one or more of the operations of the interface during the startup of the virtual machine, and wherein during compilation of the computer program, the virtual machine queries said registered one or more monitoring agents via one or more of the operations of the interface to determine whether the computer program being compiled needs a form of instrumentation.

17. The computer readable storage medium of claim 16, wherein the identifying one or more monitoring agents includes a virtual machine receiving registration information from the one or more monitoring agents.

18. The computer readable storage medium of claim 17, wherein the identifying one or more monitoring agents further includes the virtual machine querying the one or more monitoring agents to determine whether to instrument the computer program for tracking, the virtual machine filtering tracking of one or more events during execution of the computer program based the determination.

19. The computer readable storage medium of claim 18, wherein the collecting of execution metric associated with the one or more monitoring agents includes collecting execution metric for each of the one or more events being tracked.

20. The computer readable storage medium of claim 18, wherein the one or more events include one or more actions associated with one or more methods, one or more actions associated with one or more objects, or combinations thereof.

21. The computer readable storage medium of claim 16, wherein the one or more monitoring agents include an assertion agent, a typestate agent, a heap probe agent, or combinations thereof.

22. The computer readable storage medium d of claim 16, further including:
   disabling execution of the one or more monitoring agents in response to determining performance degradation of the computer program to a predetermined level.

23. The computer readable storage medium of claim 16, further including:
   recording information associated with execution of the one or more monitoring agents.

24. The computer readable storage medium of claim 16, wherein the adjusting includes:
   increasing or decreasing frequency of callbacks to the one or more monitoring agents.

* * * * *